(12) United States Patent
Brookins

(10) Patent No.: US 8,517,888 B1
(45) Date of Patent: Aug. 27, 2013

(54) MECHANICAL POWER TRANSMISSION SYSTEM AND METHOD

(76) Inventor: Ernie Brookins, West Fargo, ND (US)

( * ) Notice: Subject to any disclaimer, the term of this patent is extended or adjusted under 35 U.S.C. 154(b) by 307 days.

(21) Appl. No.: 12/986,287

(22) Filed: Jan. 7, 2011

(51) Int. Cl.
*F16H 3/44* (2006.01)

(52) U.S. Cl.
USPC .......................................... 475/303; 475/317

(58) Field of Classification Search
USPC ............ 192/3.52, 48.5, 85.48, 48.607, 85.56, 192/17 A, 18 A; 475/303, 317
See application file for complete search history.

(56) References Cited

U.S. PATENT DOCUMENTS

| | | | | |
|---|---|---|---|---|
| 2,286,223 A | * | 6/1942 | Nabstedt | 475/303 |
| 2,395,459 A | * | 2/1946 | Carnagua | 475/138 |
| 2,775,910 A | * | 1/1957 | Wilkerson | 475/124 |
| 2,806,387 A | * | 9/1957 | Forster et al. | 475/121 |
| 3,146,637 A | * | 9/1964 | Whateley et al. | 475/315 |
| 3,618,425 A | * | 11/1971 | Wickman | 475/125 |
| 4,738,163 A | * | 4/1988 | Anderson et al. | 475/321 |
| 2003/0114264 A1 | * | 6/2003 | Duan | 475/231 |

* cited by examiner

*Primary Examiner* — Justin Holmes
*Assistant Examiner* — Huan Le
(74) *Attorney, Agent, or Firm* — Dave Alan Lingbeck

(57) ABSTRACT

A mechanical power transmission system for transforming and delivering power effectively and efficiently using external pressure to propel a vehicle. The mechanical power transmission system includes a case; rotational members; a gear set being in operable communication to at least one of the rotational members; and a clutch system being in operable communication to the gear set and using external fluid pressure from a fluid source to effectively change speeds.

5 Claims, 5 Drawing Sheets

MECHANICAL POWER TRANSMISSION SYSTEM AND METHOD

BACKGROUND OF THE INVENTION

1. Field of the Invention

The present invention relates to power transfer systems and more particularly pertains to a new mechanical power transmission system for transforming and delivering power effectively and efficiently using external pressure to propel a vehicle.

2. Description of the Prior Art

The use of power transfer systems is known in the prior art. More specifically, power transfer systems heretofore devised and utilized are known to consist basically of familiar, expected and obvious structural configurations, notwithstanding the myriad of designs encompassed by the crowded prior art which have been developed for the fulfillment of countless objectives and requirements.

The prior art includes transmissions comprising input and output shafts and also gear sets being in operable communication with the gear sets and clutches including friction plates with fluid from within the case being used to apply the clutch friction plates to effect speed changes by engaging selected gear sets. While these devices fulfill their respective, particular objectives and requirements, the aforementioned patents do not disclose a new mechanical power transmission system.

SUMMARY OF THE INVENTION

The general purpose of the present invention, which will be described subsequently in greater detail, is to provide a new mechanical power transmission system which has many of the advantages of the power transfer systems mentioned heretofore and many novel features that result in a new mechanical power transmission system which is not anticipated, rendered obvious, suggested, or even implied by any of the prior art power transfer systems, either alone or in any combination thereof. The present invention includes a case; rotational members; a gear set being in operable communication to at least one of the rotational members; and a clutch system being in operable communication to the gear set for changing speeds. None of the prior art includes the combination of the elements of the present invention.

There has thus been outlined, rather broadly, the more important features of the mechanical power transmission system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new mechanical power transmission system which has many of the advantages of the power transfer systems mentioned heretofore and many novel features that result in a new mechanical power transmission system which is not anticipated, rendered obvious, suggested, or even implied by any of the prior art power transfer systems, either alone or in any combination thereof.

Still another object of the present invention is to provide a new mechanical power transmission system that uses external pressure to effectively change speeds.

Still yet another object of the present invention is to provide a new mechanical power transmission system that substantially increases fuel efficiency because of reduced weight due to the fluid being external rather than internal.

Even still another object of the present invention is to provide a new mechanical power transmission system that will provide more overdrive or underdrive depending of the arrangement of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
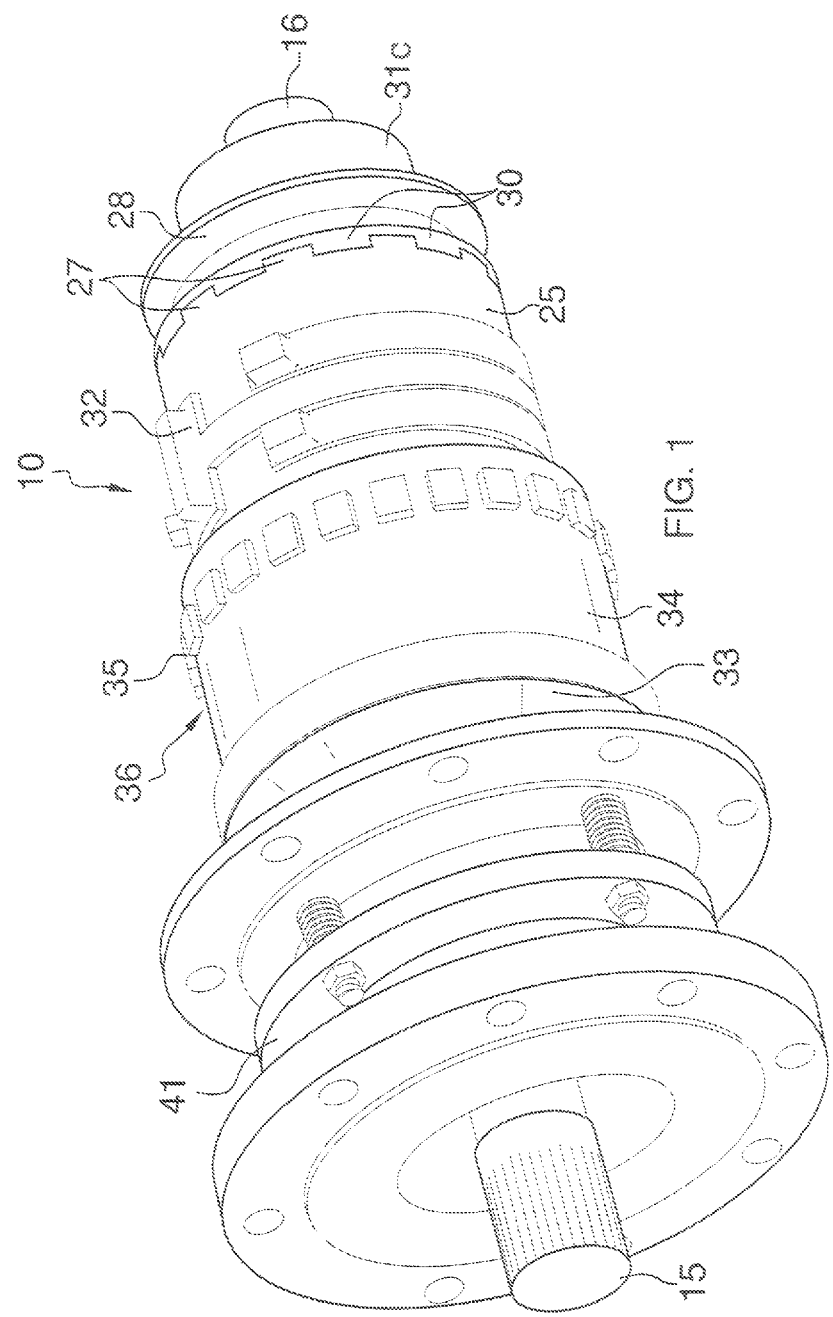
FIG. 1 is a side perspective view of a new mechanical power transmission system according to the present invention.
Figure 2:
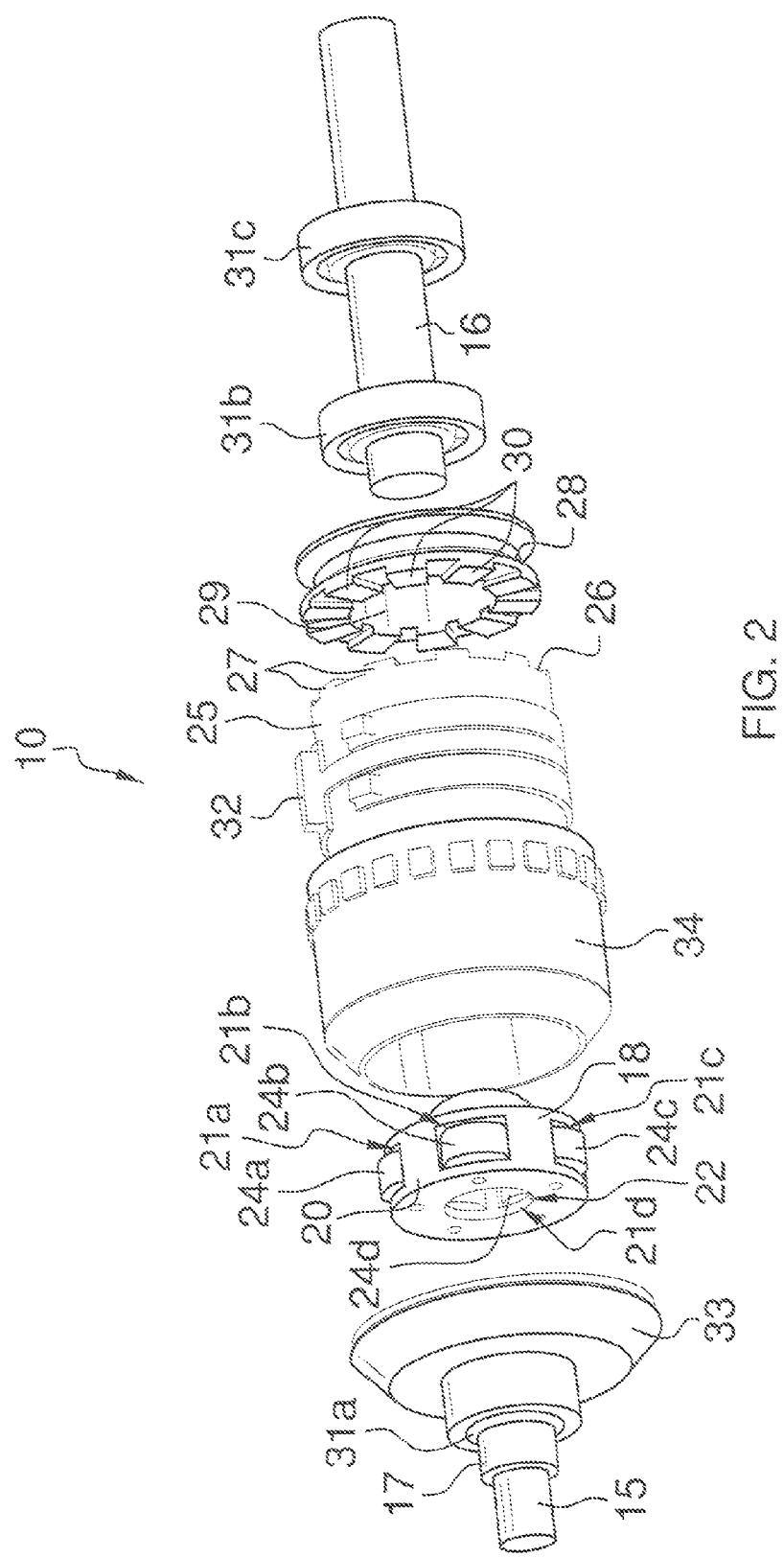
FIG. 2 is an exploded perspective view of the present invention.
Figure 3:
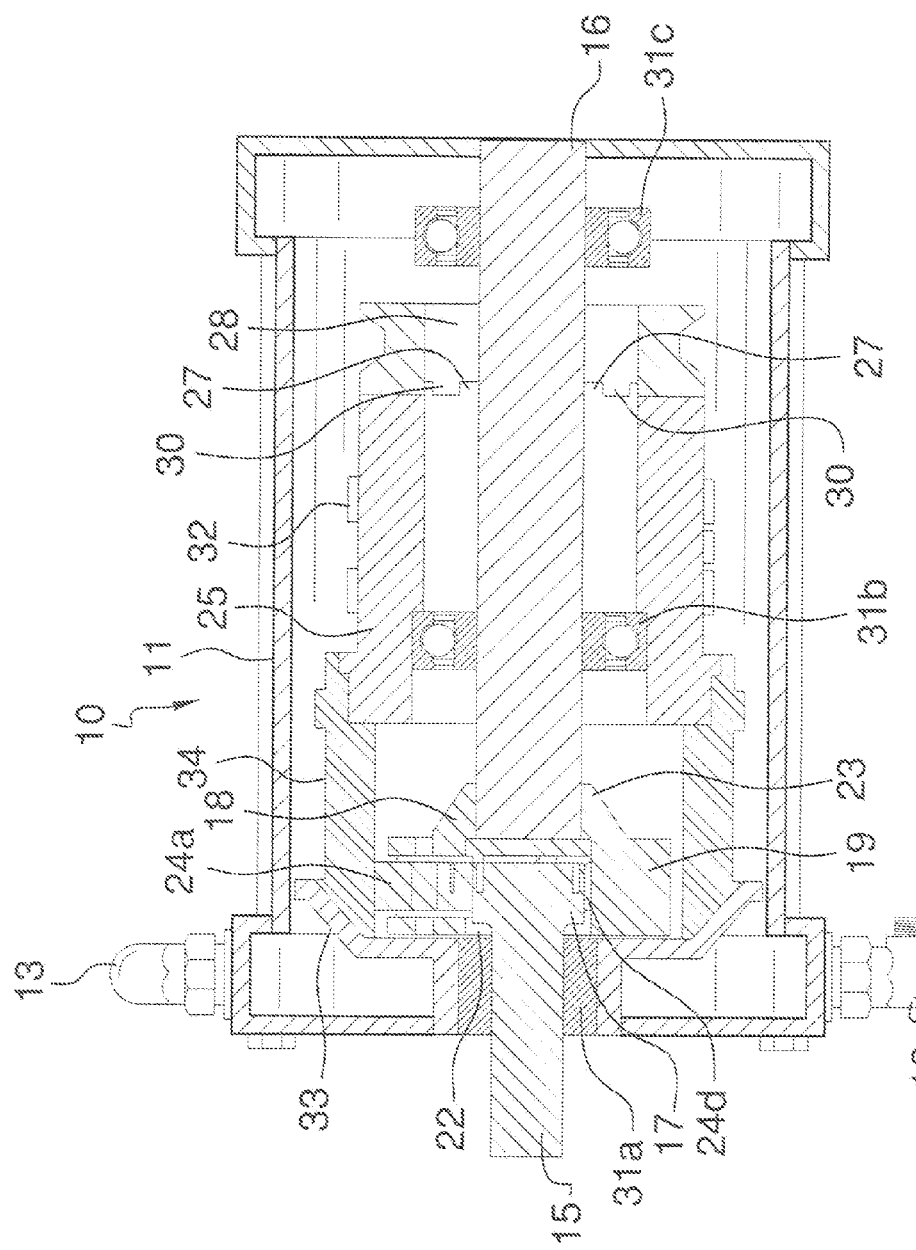
FIG. 3 is a side cross-sectional view of the present invention.
Figure 4:
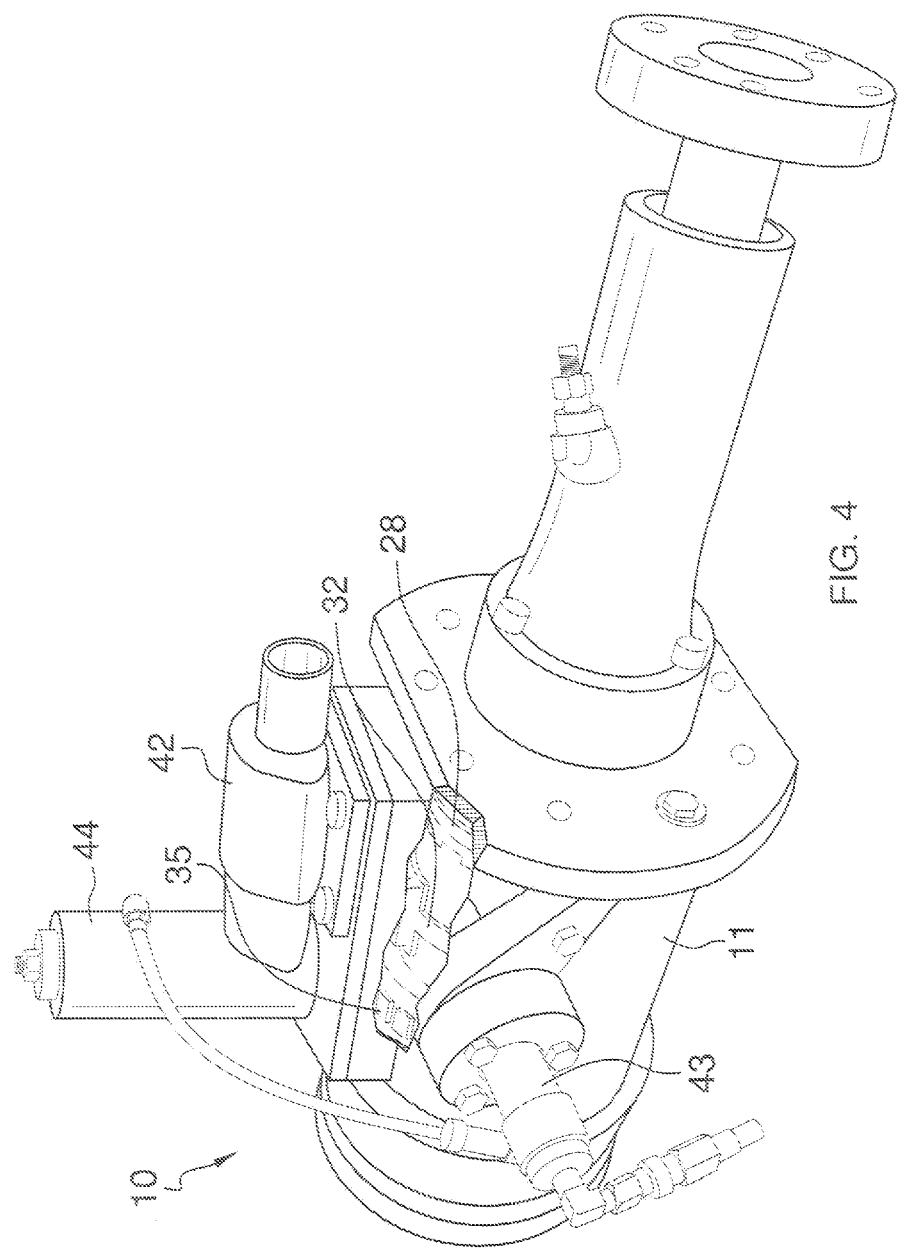
FIG. 4 is a perspective view of the present invention.
Figure 5:
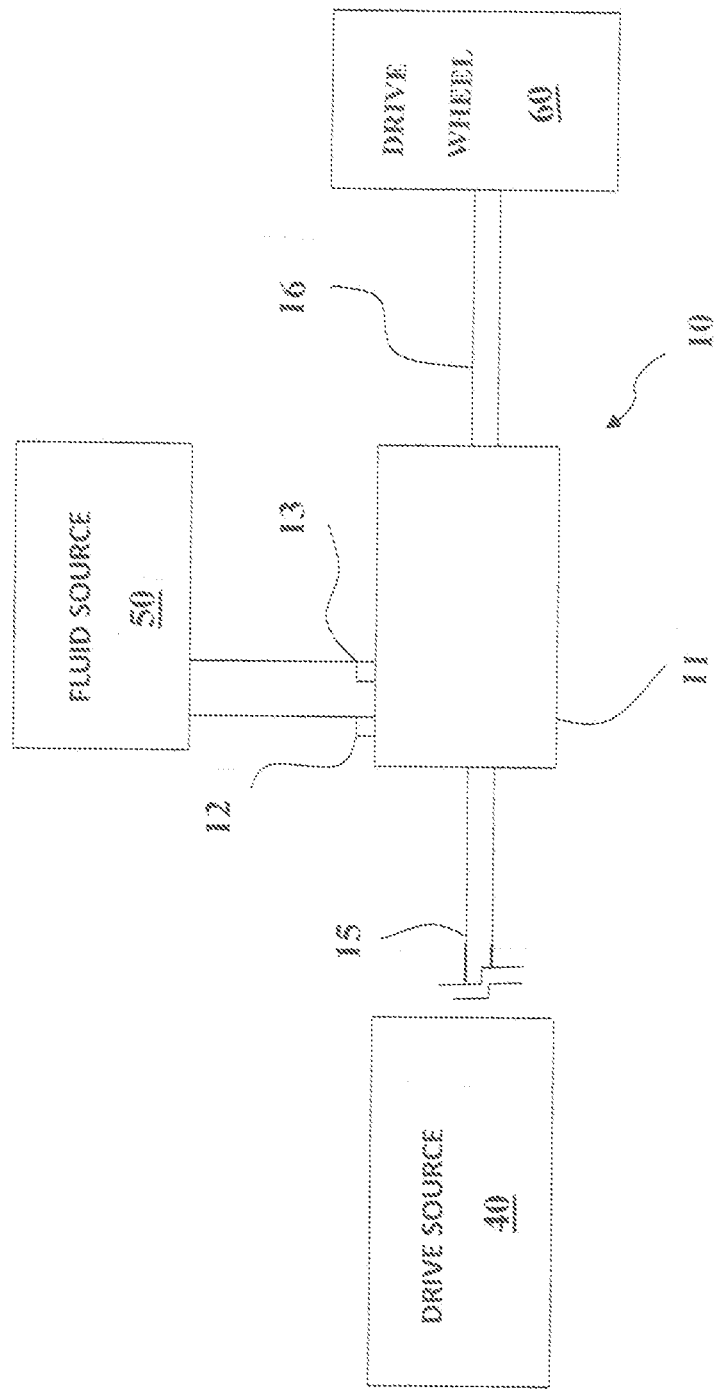
FIG. 5 is a schematic diagram of the present invention and its relationships.

With reference now to the drawings, and in particular to FIGS. 1 through 5 thereof, a new mechanical power transmission system embodying the principles and concepts of the present invention and generally designated by the reference numeral 10 will be described.

As best illustrated in FIGS. 1 through 5, the mechanical power transmission system 10 generally comprises a case 11, rotational members 15,16 extending into the case 11, a gear set 17, 18, 24a-d, 25 being in operable communication and conventionally connected to at least one of the rotational members 15,16 and being disposed in the case 11, and a clutch means being movably engagable to the gear set 17, 24a-d, 25 and including fluid from an external fluid source 50 for effecting various speeds. The gear set 17, 24a-d, 25 includes a first gear 17 being in operable communication and conventionally connected to one of the rotational members 15,16. The rotational members 15,16 include a first rotational member 15. The first gear 17 is conventionally engaged to the first rotational member 15. The gear set 17,24a-d,25 further includes a planetary carrier 18 being rotatably and conventionally disposed in the case 11 and also includes planetary gears 24a-d being rotatably and conventionally supported by the planetary carrier 18 and being in operable communication to and conventionally engaged to the first gear 17. The gear set 17,24a-d,25 further includes a second gear 25 being rotatably and conventionally disposed in the case 11 and being in operable communication and engagable to the planetary gears 24a-d.

The planetary carrier 18 includes a housing 19 having a side wall 20 and first and second ends 22,23. The side wall 20 has slots 21a-d spacedly-disposed thereabout and therethrough. The planetary gears 24a-d are rotatably and at least partially disposed in and through the slots 21a-d and are in operable communication and enagable to the first and second gears 17,25. The first rotational member 15 is disposed through the first end 22 of the housing 19. The rotational members 15,16 also include a second rotational member 16 which is conventionally supported with bearings 31b,c and which is conventionally engaged in the second end 23 of the housing 19 of the planetary carrier 18 to achieve either underdrive or overdrive speed.

The clutch means includes at least one coupling member 28,33 being selected from a group comprising a cone clutch 33 and a gear coupler 28. The cone clutch 33 has an opening centrally disposed therethrough with the first rotational member 15 being disposed through the opening of the cone clutch 33 and the cone clutch 33 being movably and biasedly journaled with a bearing 31a, about and along the first rotational member 15 with a concavity end of the cone clutch 33 being engagable to the second gear 25. The second gear 25 is a ring gear 25 to effect direct drive speed and is conventionally supported by a housing member 34. The clutch means also includes a gear coupler 28 having an opening being centrally disposed therethrough with the second rotational member 16 being disposed through the opening of the gear coupler 28 with the gear coupler 28 being engaged about and movable along the second rotational member 16 and being engagable to the ring gear 25 for effecting direct drive speed by coupling the ring gear 25 to the second rotational member 16. The gear coupler 28 has an end 29 with teeth 30 being spacedly extending outwardly therefrom. The gear coupler 28 is disc-shaped. The ring gear 25 has an outer end 26 with teeth 27 extending outwardly therefrom. The teeth 30 of the gear coupler 28 are engagable with the teeth 27 of the ring gear 25 to effect direct drive speed.

The clutch means also includes ports 12,13 being disposed through at least one wall of the case 11 and being in fluid communication with the fluid source 50, and also includes actuators 41-44 being in fluid communication to the ports 12,13 with the actuators 41-44 being in operable communication and conventionally engaged to the cone clutch 33 and the gear coupler 28 with fluid from the fluid source 50 being conventionally controlled and applied to the actuators 41-44 to cooperatively move the cone clutch 33 and the gear coupler 28 relative to the ring gear 25. The actuators 41-44 includes a first actuator 41 which is conventionally disposed inside the case 11 and is in operable communication and conventionally engaged to the cone clutch 33 for moving the cone clutch 33 to engage or disengage from the ring gear 25, and also includes a second actuator 42 which is conventionally disposed and mounted outside the case 11 and is in operable communication and in conventional contactable relationship to the gear coupler 28 for urging the gear coupler 28 in cooperation with the cone clutch 33 to engage or disengage from the ring gear 25.

Upon fluid from the fluid source 50 actuating the first and second actuators 41,42, the first actuator 41 moves the cone clutch 33 into engagement with the ring gear 25 and the second actuator 42 simultaneously moves the gear coupler 28 into engagement with the ring gear 25 for direct drive speed. The fluid source 50 includes a hydraulic pump being in fluid communication and conventionally connected to the case 11. The first actuator 41 includes a conventional throw-out bearing. The fluid from the fluid source 50 moves the throw-out bearing; whereupon the throw-out bearing engages and moves the cone clutch 33. The second actuator 42 includes a conventional hydraulic cylinder and fork. The fluid from the fluid source enters the hydraulic cylinder and moves the fork; whereupon the fork engages and moves the gear coupler 28.

The clutch means also includes braking members 32,35 being engagable to the ring gear 25 to prevent the rotation of the ring gear 25 to effect either under-drive or overdrive speed. Other actuators 43-44 are in operable communication and in conventional contactable relationship to the braking members 32,35 and are in fluid communication to the fluid source 50 for urging the braking members 32,35 to engage or disengage from the ring gear 25. The braking members 32,35 include a band 32 which is conventionally engagable about the ring gear 25 and also includes a pin 35 which is conventionally engagable to the ring gear 25. The actuators 41-44 include a third actuator 43 which is disposed and conventionally mounted outside the case 11 and is in fluid communication to the fluid source 50 and in operable communication and in conventional contactable relationship to the band 32 and also includes a fourth actuator 44 which is also disposed and conventionally mounted outside the case 11 and is in fluid communication to the fluid source 50 and in operable communication and in conventional contactable relationship to the pin 35. The fluid from the fluid source 50 is conventionally controlled and applied to the third and fourth actuators 43,44 to cooperatively engage the band 32 about the ring gear 25 and to engage the pin 35 with the ring gear 25, respectively, to prevent rotation of the ring gear 25 to effect either under-drive or overdrive speed. The third and fourth actuators 43,44 are conventional hydraulic cylinders. The fluid from the fluid source 50 enters the hydraulic cylinders and moves the conventional pistons (not shown) in the hydraulic cylinders; whereupon, the pistons contact and move the braking members 32,35.

In use, a drive source 40 such as an engine, or any suitable drive transmitting device such as a torque converter or another transmission transmits rotational power to one of the rotational members 15,16 which in turn actuates the gear set 17,24a-d,25 and the gear set 17,24a-d,25 then actuates another rotational member 15,16 which drives the drive wheels 60 at various speeds. For under-drive or overdrive speed, the ring gear 25 is decoupled from the second rotational member 16 and is prevented from rotating to achieve either under-drive or overdrive speed. The planetary gears 24a-d are locked up as a result with the planetary carrier 18 effecting rotation of one of the rotational members 15,16. Fluid pressure from the fluid source 50 is applied to the third and fourth actuators 43,44 which urges the braking members 32,35 to engage the ring gear 25 and prevent the rotation thereof to achieve either under-drive or overdrive speed. Fluid pressure is conventionally applied to the third and fourth actuators 43,44 which cooperatively and conventionally move and engage the band 32 about the ring gear 25 and urge and move the pin 35 into engagement with the ring gear 25 to achieve either under-drive or overdrive speed upon the planetary carrier 18 driving one of the rotational members 15,16.

For direct drive speed, the baking members 32,35 are conventionally disengaged from the ring gear 25, fluid pressure from the fluid source 50 is conventionally applied to the first and second actuators 41,42 which cooperatively move the cone clutch 33 and the gear coupler 28 into engagement with the ring gear 25. The gear coupler 28 is conventionally engaged about the second rotational member 16. The first rotational member 15 drives the planetary gears 24*a-d* which rotate the ring gear 25, and the ring gear 25 drives the second rotational member 16 since the ring gear 25 is coupled to the second rotational member 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the mechanical power transmission system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mechanical power transmission system comprising:
    a case;
    at least one rotational member;
    a gear set being in operable communication with said at least one rotational member wherein said gear set includes a first gear being in operable communication with said at least one rotational member, wherein said gear set further includes a planetary carrier and also includes planetary gears being rotatably supported by said planetary carrier and being in operable communication with said first gear, wherein said gear set further includes a second gear being in operable communication with said planetary gears, wherein said second gear is a ring gear; and
    a clutch means being in operable communication with said gear set and adapted to use external fluid pressure from a fluid source for changing speeds; wherein said clutch means includes a cone clutch and a gear coupler, wherein said clutch means also includes actuators with fluid pressure from the fluid source being controllably appliable to said at least one of said actuators, wherein said at least one of said actuators includes a first actuator which is in operable communication with said cone clutch for moving said cone clutch to engage or disengage from said ring gear, and also includes a second actuator which is in operable communication with said gear coupler for urging said gear coupler in cooperation with said cone clutch to engage or disengage from said ring gear.

2. The mechanical power transmission system as described in claim 1, wherein upon fluid pressure from said fluid source actuating said first and second actuators, said first actuator moves said cone clutch into engagement with said ring gear and said second actuator moves said gear coupler into engagement with said ring gear for direct drive speed.

3. A method of transmitting mechanical power and using external fluid pressure to effect various speeds comprising:
    actuating a first rotational member from a drive source; and
    achieving various speeds whereupon said first rotational member actuates a gear set and the gear set actuates a second rotational member to power drive wheels at various speeds, wherein said gear set includes a first gear being connected to said first rotational member and also includes a planetary carrier with planetary gears being in operable communication with said first gear and further includes a ring gear being in operable communication with said planetary gears, wherein said planetary carrier is in operable communication with said second rotational member, wherein said achieving various speeds further includes coupling said ring gear to said second rotational member for direct drive speed, wherein said achieving various speeds also includes decoupling said ring gear from said second rotational member and preventing rotation of said ring gear to achieve under-drive or overdrive speed, wherein said planetary gears are locked up with said planetary carrier effecting rotation of one of said rotational members.

4. The method of transmitting mechanical power and using external fluid pressure to effect various speeds as described in claim 3, wherein said decoupling said ring gear includes applying fluid pressure from a fluid source to at least one actuator which urges at least one braking member to engage said ring gear and prevent the rotation thereof to achieve under-drive or overdrive speed.

5. The method of transmitting mechanical power and using external fluid pressure to effect various speeds as described in claim 4, wherein said at least one braking member includes a band being engagable about said ring gear and a pin being engagable to said ring gear, wherein said applying fluid pressure includes applying fluid pressure to actuators which cooperatively engage said band about said ring gear and urge said pin into engagement with said ring gear to achieve under-drive or overdrive speed upon said planetary carrier driving on of said rotational members.

\* \* \* \* \*